UNITED STATES PATENT OFFICE.

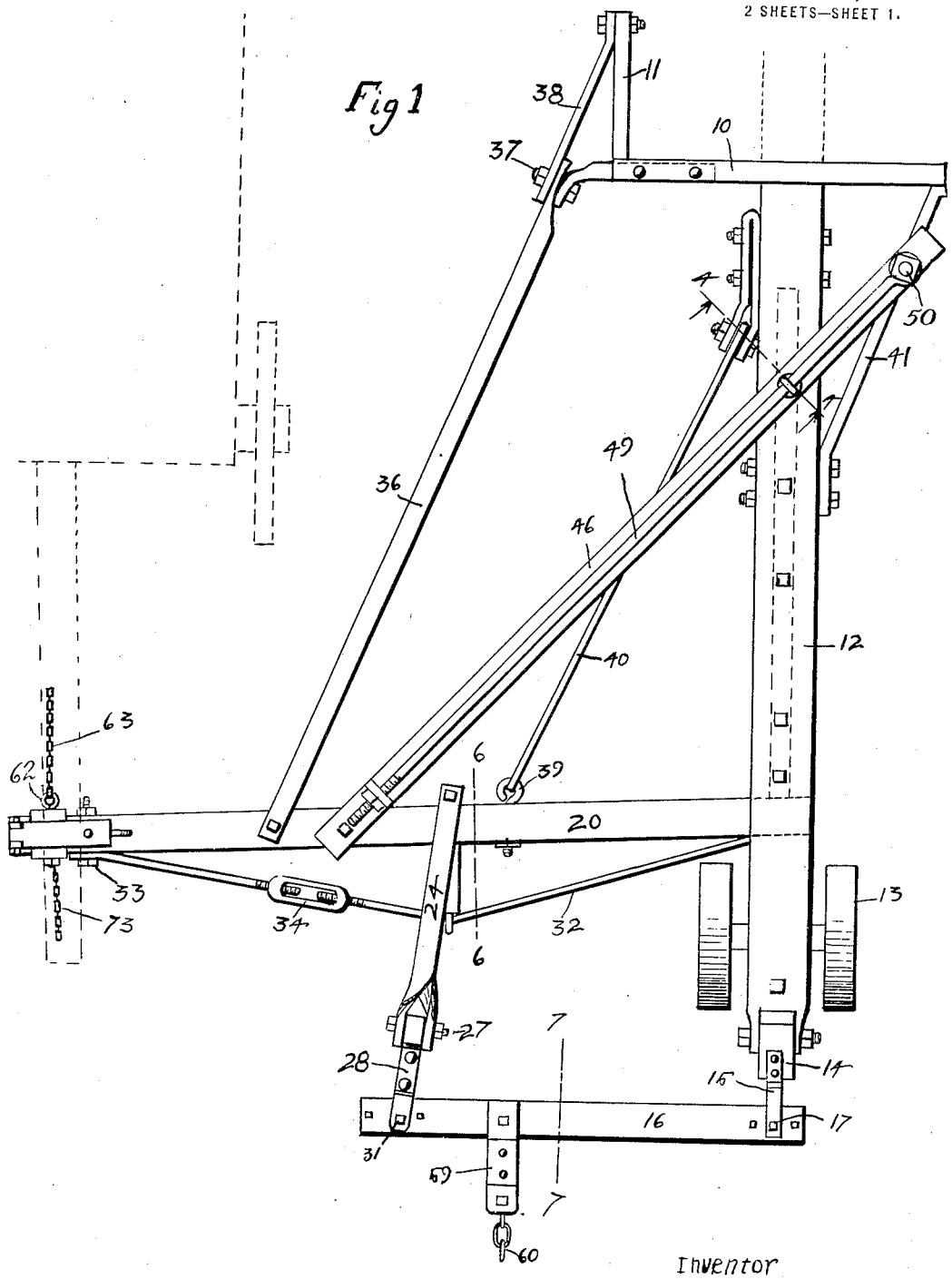

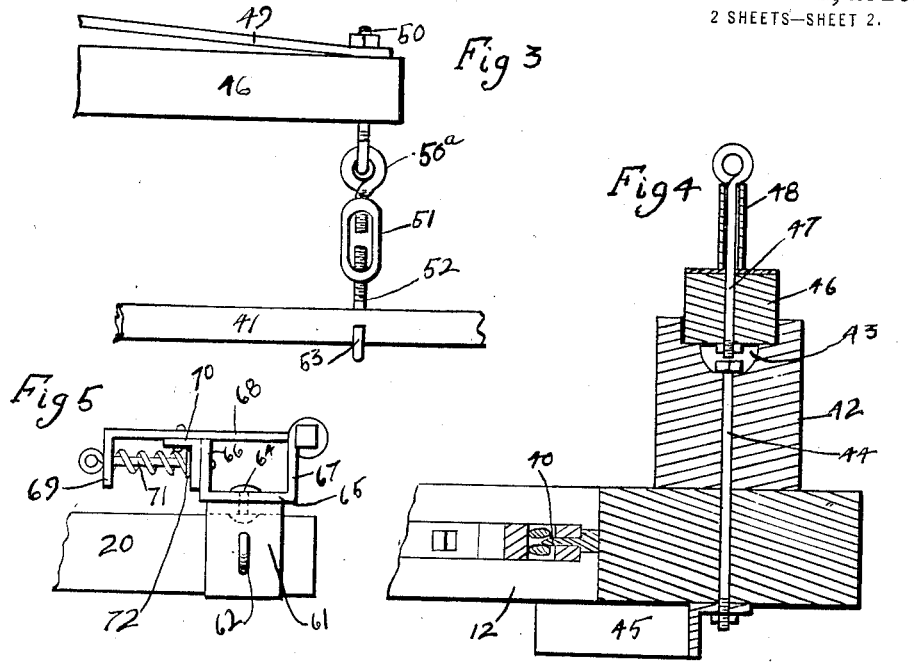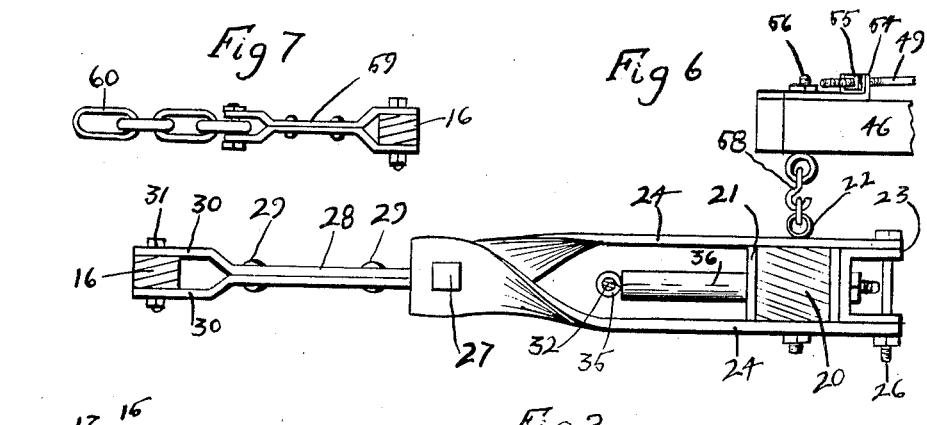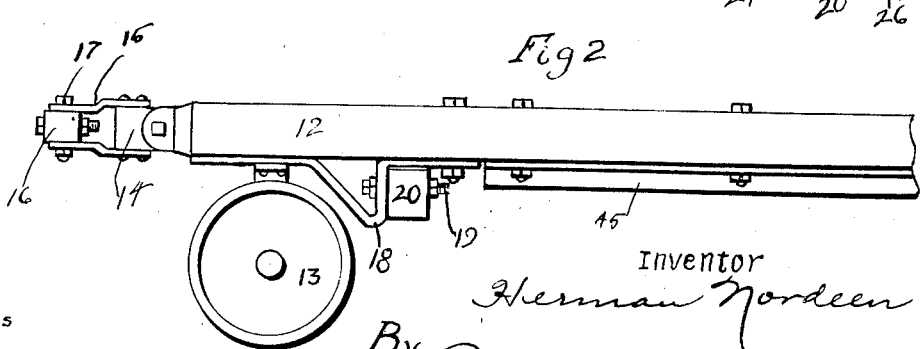

HERMAN NORDEEN, OF HARCOURT, IOWA.

COMBINATION-HITCH FOR HARVESTING-MACHINES AND WAGONS.

1,357,721.  Specification of Letters Patent.  Patented Nov. 2, 1920.

Application filed December 23, 1919. Serial No. 347,037.

*To all whom it may concern:*

Be it known that I, HERMAN NORDEEN, a citizen of the United States, and a resident of Harcourt, in the county of Webster and State of Iowa, have invented a certain new and useful Combination-Hitch for Harvesting-Machines and Wagons, of which the following is a specification.

The object of my invention is to provide a combination hitch for a harvesting machine such as a corn harvester, and a wagon.

More particularly it is my object to provide such a combination hitch, whereby a harvesting machine such as a corn harvester, and also a wagon may be drawn behind a tractor or the like, the device being of simple, durable and inexpensive construction, and being so arranged as to permit sufficient play of the parts, so that they will not bind, and will permit the wagon or corn harvester to properly travel behind the tractor.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 is a top or plan view of a combination hitch embodying my invention.

Fig. 2 is a side elevation of part of the device.

Fig. 3 is a detail view of one end of the supporting bar forming part of the hitch.

Fig. 4 is a detail, sectional view taken on the line 4—4 of Fig. 1.

Fig. 5 is a detail view of the rear part of a portion of the hitch.

Fig. 6 is a detail, sectional view taken on the line 6—6 of Fig. 1.

Fig. 7 is a sectional, detail view taken on the line 7—7 of Fig. 1.

In the accompanying drawings, I have used the reference numerals 10 and 11 to show portions of the frame of a corn harvester.

Where my hitch is used, I preferably remove the ordinary short tongue of the corn harvester and insert in its place a tongue 12 which may be similar in construction but is longer than the ordinary tongue.

The front end of the tongue 12 is supported by a suitable truck 13.

Pivotally mounted at the front end of the tongue for up and down swinging movement, is a bar or block 14 secured to which are upper and lower spaced strips 15 which extend forwardly and receive between their forward ends a draft bar 16, to which said strips 15 are pivoted by means of the bolt 17.

Secured to the lower surface of the tongue 12 near the forward end thereof, just rearwardly of the truck 13 and extending downwardly from the tongue is a bracket 18 to which is pivoted, by means of the horizontal bolt 19, a cross bar 20.

Near the middle of the bar 20 from end to end there are provided wear plates 21 on the front and rear of said bar, and back of the rear wear plate is a rearwardly opening short channel iron 23.

Extending across the bar 20, above and below said bar, are metal strips 24 which are pivoted to the channel 23 by means of an upright bolt 26.

The strips 24 extend forwardly from the bar 20 and are twisted at their forward ends from horizontal to vertical position, as shown in Figs. 1 and 6.

Mounted in the forward ends of the strips 24 is a transverse bolt 27.

The metal strip 28 is bent at its center around the bolt 27 for pivotally connecting the strip 28 with the bolt 27, and the parts of the strip 28 are extended forwardly from the bolt 27 adjacent to each other, as shown in Fig. 6, and are riveted together as at 29.

At the forward end of the strip 28, the ends thereof are spread apart as at 30, and receive between them the draft bar 16 to which the said ends are pivoted by means of a bolt 31.

The bar 20 is trussed or reinforced by means of a two-part rod 32. The extreme ends of the rod 32 are mounted respectively on bolts 19 and 33 extended through the bar 20 near the end thereof.

Mounted on the adjacent ends of the two parts of the bar 32 is a turn-buckle 34. Near its central part the bar 32 is held in a position spaced from the bar 20 by the following means.

Extended through the channel 23, the bar 20 and the wear plates 21, is an eye-bolt 35 which projects forwardly a substantial distance beyond the bar 20. Mounted on the eye-bolt 35 is a spacer sleeve 36. The eye of the eye-bolt 35 at its forward end receives the rod 32, as illustrated in Figs. 1 and 6.

Pivotally connected with the bar 20, at a point between the strips 24 and the end of said bar opposite the tongue 12 is a connecting brace 36 which is also pivoted to the frame 10 by means of a bolt 37.

The connecting brace 36 is connected with the frame member 11 by means of a short brace 38 mounted on the bolt 37.

Mounted in the bar 20 between the strips 24 and the tongue 12 is an eye-bolt 39 to which is pivoted a rod 40 inclined rearwardly and toward the tongue 12, and pivoted thereto for vertical swinging movement.

For supporting the bar 20 and holding up the left-hand end thereof, as illustrated in Fig. 1, I have provided the following means:

A brace 41 connects the tongue 12 and the frame member 10 as illustrated in Fig. 1, and is located on the right-hand side of said tongue.

Supported on the tongue 12 near the rearward end thereof is a block 42.

The block 42 has a recess 43 in its upper surface. The block 42 is fastened to the tongue 12 by means of a bolt 44.

On the bottom of the tongue 12 is an angle-iron reinforcing member 45 through which the bolt 44 extends.

Resting in the recess 43 is a supporting bar 46, which is substantially horizontal and is inclined diagonally with relation to the tongue 12, extending from position above the brace 41 to position above the bar 20, as illustrated in Fig. 1.

Mounted in the bar 46, above the block 42, is an upright eye-bolt 47 which projects above the supporting bar 46. Mounted on the eye-bolt 47 above the bar 46 is a sleeve 48.

Extended through the eye at the upper end of the eye-bolt 47 is a truss rod 49 which inclines downwardly from the eye-bolt toward the opposite ends of the bar 46. At the rearward ends of the rod 49 and bar 46, an eye-bolt 50 is extended through the bar 46 and is secured to the rod 49, as illustrated in Fig. 3.

Mounted on the lower end of the eye-bolt 50 is an eye-bolt 50ᵃ one end of which is mounted in a turn-buckle 51. Received in the outer end of the turn-buckle 51 is the screw-threaded shank of a bolt 52, having the hook shaped head 53 which receives the brace 41.

At the opposite end of the supporting bar 46 on the upper surface thereof is an angle-iron bracket 54, through which the truss rod 49 is extended, as shown in Fig. 6.

On the end of the truss rod 49 is a nut 55, by which the tension on said rod may be adjusted.

Extending through the bracket 54 and the bar 46 is an eye-bolt 56. Extended through the bar 20 is an eye-bolt 22. The eye-bolts 56 and 22 are detachably connected by a hook 58.

Pivotally connected with the draft bar 16 is a clevis device 59 to which is secured a chain or the like 60 which may be connected with a tractor.

At the right-hand end of the bar 20 is a device for hitching a wagon to my combination hitch.

Mounted on the right-hand end of the bar 20 is a downwardly opening channel shaped member 61.

An eye-bolt 52 extends through the walls of the member 61 and through the bar 20 and is connected with a chain 63 which may be fastened to a wagon.

Pivotally supported on the upper surface of the member 61 by means of a pin or the like 64, is a transverse bar 65 having at its opposite ends upwardly extending members 66 and 67.

Pivoted to the upper edge of the member 67 is a locking bar 68, which extends to the left, as shown in Figs. 1 and 5 beyond the member 66.

At the free end of the bar 68 is a downwardly extending flange 69. Mounted on the under surface of the bar 68 is an angle-iron bracket member or the like 70, which, when the locking bar 68 is in closed position, has one flange which rests adjacent to the member 66, as shown in Fig. 5.

Slidably mounted in the flange 69, and the last named flange of the angle-iron 70 is a locking bolt 71, on which, adjacent to the angle iron 70, is a stop member 72 which is engaged by a spring for normally tending to move the locking bolt 71 toward locking position.

In the upwardly extending member 66 is a hole for receiving the end of the locking bolt 71.

Extending forwardly from the right-hand end of the bar 20 is a chain or the like 73.

In the practical use of my improved combination hitch, the hitch is preferably assembled on the corn harvester in the manner hereinbefore described, and is preferably left as a permanent attachment thereto.

The hitch is bolted to the corn harvester so that it can be removed if desired.

It will be seen that the corn harvester can be drawn forwardly by the tractor when desired, by the use of my combination hitch.

The bar 46 with its truss rod 49 supports the right-hand end of the bar 20, as herein clearly shown.

When the corn harvester is in use and it is desired to discharge the corn into a wagon bed, the wagon is drawn along side the corn harvester.

The locking bolt 71 is withdrawn and the locking bar 68 raised, whereupon the tongue of the wagon is laid into the receiving membar formed by the bar 65 and the upwardly extending members 66 and 67, as illustrated, for instance, by dotted lines in Fig. 1.

The chain 73 is fastened to the tongue forwardly of the bar 20, while the chain 63 is fastened to the tongue or to the wagon rearwardly of the bar 20.

The locking bar 68 is then lowered and the locking bolt 71 is permitted to enter the opening in the member 66, whereby the tongue will be held against jumping out of its keeper.

It will be seen that the left-hand end of the bar 20 is pivoted for permitting some up and down play.

The tongue supporting bar 65 being pivoted, permits the parts to swing horizontally with relation to each other, and particularly permits the wagon tongue to swing to different positions with relation to the bar 20 in turning corners and the like.

The chain 73 prevents the wagon from overrunning the bar 20, while the chain 63 takes the draft of the wagon load.

With my improved combination hitch, the draft is fairly well distributed, and it is possible to readily hitch the wagon to the tractor in such a way as to permit the wagon to travel along side the corn harvester. This has, heretofore, been a rather difficult thing to do, and the advantage of a suitable convenient, and comparatively inexpensive hitch by which said result can be accomplished is largely obvious.

Some changes may be made in the construction and arrangement of the parts of my combination hitch without departing from the essential spirit and purpose of my invention, and it is my intention to cover by my claims any modified forms of structure or use of mechanical equivalents which may be reasonably included within their scope.

I claim as my invention:

1. A combination hitch comprising the combination of a tongue, with a bar pivotally supported thereon and extending laterally therefrom; a truss structure supported on said tongue for holding up the laterally projecting end of said bar; a pair of braces connected with said bar for preventing horizontal swinging movement thereof; means for connecting said bar with a vehicle; a truck for supporting said tongue; a draft bar pivotally connected with the forward end of said latter tongue and extending laterally; and means for connecting the laterally extending end of said draft bar with said first bar, said means including a pivot joint.

2. A combination hitch comprising the combination of a tongue, with a bar pivotally supported thereon and extending laterally therefrom; a truss structure supported on said tongue for holding up the laterally projecting end of said bar; and means for connecting the free end of said bar with the tongue of a vehicle for permitting swinging movement of the latter tongue.

3. A combination hitch comprising the combination of a tongue, with a bar pivotally supported thereon and extending laterally therefrom; a trus structure supported on said tongue for holding up the laterally projecting end of said bar; braces connected with said bar; and means for connecting said bar with the tongue of a vehicle for permitting swinging movement, and limited sliding movement of the latter tongue.

4. A combination hitch comprising the combination of a tongue, with a bar pivotally supported thereon and extending laterally therefrom; a truss structure supported on said tongue for holding up the laterally projecting end of said bar; means for preventing horizontal movement of said bar with relation to said tongue; means for connecting said bar with the tongue of a vehicle, said means including a device for supporting the latter tongue for pivotal movement; and flexible members adapted to be connected with the latter tongue in front and rear respectively of said bar.

Des Moines, Iowa, November 21, 1919.

HERMAN NORDEEN.